(12) United States Patent
Rifkin

(10) Patent No.: US 9,961,878 B2
(45) Date of Patent: May 8, 2018

(54) MULTIFUNCTIONAL LIQUID DISPENSING GROOMING SYSTEM FOR PETS

(71) Applicant: Josh Rifkin, Solana Beach, CA (US)

(72) Inventor: Josh Rifkin, Solana Beach, CA (US)

(*) Notice: Subject to any disclaimer, the term of this patent is extended or adjusted under 35 U.S.C. 154(b) by 304 days.

(21) Appl. No.: 15/065,311

(22) Filed: Mar. 9, 2016

(65) Prior Publication Data
US 2016/0262346 A1    Sep. 15, 2016

Related U.S. Application Data

(60) Provisional application No. 62/177,175, filed on Mar. 9, 2015.

(51) Int. Cl.
A01K 13/00    (2006.01)
A01K 15/02    (2006.01)

(52) U.S. Cl.
CPC .......... *A01K 13/002* (2013.01); *A01K 13/001* (2013.01); *A01K 15/02* (2013.01)

(58) Field of Classification Search
CPC .... A01K 13/00; A01K 13/001; A01K 13/002; A01K 15/02
USPC ......................................... 119/601
See application file for complete search history.

(56) References Cited

U.S. PATENT DOCUMENTS

| | | | | |
|---|---|---|---|---|
| 5,115,765 A | * | 5/1992 | El Omary | A01K 13/002 119/606 |
| 9,839,198 B2 | * | 12/2017 | Owen | A01K 13/00 |
| 2002/0073930 A1 | * | 6/2002 | Kan | A01K 13/002 119/631 |
| 2006/0133886 A1 | * | 6/2006 | Willinger | A01K 13/001 401/186 |
| 2007/0144451 A1 | * | 6/2007 | Hurwitz | A01K 13/002 119/603 |
| 2007/0209671 A1 | * | 9/2007 | Hase | A01K 13/002 132/109 |
| 2011/0239955 A1 | * | 10/2011 | Miller | A01K 13/001 119/673 |
| 2017/0295903 A1 | * | 10/2017 | Coffee | A45D 19/02 |

* cited by examiner

*Primary Examiner* — Monica L Williams
*Assistant Examiner* — Aaron M Rodziwicz
(74) *Attorney, Agent, or Firm* — David B. Waller

(57) ABSTRACT

The present invention provides a device and method of using the device for pet care. The device has a housing divided into two halves that may be fastened together to form a single item such as a ball. Each of the halves having an interior side, an exterior side and a circumferential edge that contains the locking means to removably fasten the halves together. One half of the device having a refillable liquid cavity with cap for holding liquid, a reusable sponge, massaging bristles extending through and beyond the reusable sponge on the interior side, and a liquid dispensing mechanism with one or more apertures for releasing the fluid into the reusable sponge. The other half is hollow and has a grooming surface and vents to allow the reusable sponge to dry when the device is fastened together. Methods of using the device are also provided.

12 Claims, 3 Drawing Sheets

MULTIFUNCTIONAL LIQUID DISPENSING GROOMING SYSTEM FOR PETS

CROSS-REFERENCE TO RELATED APPLICATIONS

This application is a claims priority to U.S. Provisional Application Ser. No. 62/177,175, filed on 9 Mar. 2015, which is incorporated herein in its entirety by this reference.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

TECHNICAL FIELD

The present invention is a device and methods of using the device for pet care. More specifically for pet grooming.

BACKGROUND OF THE INVENTION

There are a number of devices that have been invented and currently sold on the market for pet grooming, including brushes and combs for removing loose hair, deshedding devices and items that assist in cleaning, lathering and bathing pets. For example, there are devices for removing loose hair having a nippled polymer surface that uses the friction created when moving the polymer surface over the fur to capture and remove loose hair. The petandme website on the Internet provides an example of this type of device. Unfortunately, this device only provides effective hair removal when the fur is dry and cannot be used efficiently when bathing a pet.

There are a number of deshedding devices such as the Furminator™ and similar devices such as those described in U.S. Pat. No. 7,509,926 to Porter et al. and U.S. Pat. No. 8,528,501 to Prochaska that have bladed combs to catch fur that is in the process of being shed. Similar to devices for loose hair removal, these devices are most effective when the pet's fur is dry and should probably not be used when bathing a pet.

Other devices are designed to be utilized when bathing a pet such as the device described in U.S. Pat. No. 7,509,925 to Embry. This device contains a handheld housing, a chamber for bathing solution and a connector for a hose to provide a continuous supply of water. This is a problem if water conservation is desired or the animal is small and the water requirement is minimal. Other similar devices that do not require a continuous supply of water contain reservoirs within their structure that continually release the bathing fluid during use. For example, U.S. Pat. No. 6,834,619 to Rampersad is a mitt with a hollow interior that is used to house bathing fluid, which is released when pressure is applied by bending the mitt. Unfortunately, this presents problems in the event that the mitt: is bent inadvertently such as in the act of restraining the pet during the bath; no longer provides sufficient pressure to release the bathing fluid because the reservoir is low; or releases too much when the reservoir is full or too much pressure is applied when scrubbing the fur.

The Rampersad device comprises a handheld housing containing a depressible fluid bladder with massaging nibs on the side that dispenses the bathing solution. This device suffers from the same problems as the Embry device. Because the depressible areas for fluid release are positioned on the finger gripping portion of the housing vigorous use of the device can result in inadvertent dispensing of fluid from the chamber. In addition, because the valve port is centrally located in the bathing area of the device, dispensing can only be effective when the device is held parallel to the ground. Unfortunately, it is desirable to dispense fluid on all areas of the pet including the sides and belly which would be difficult to achieve with this device.

Consequently, there is a need in the pet grooming industry for a single device that may be used for effective and efficient bathing of a pet which includes the ability to dispense bathing solution on the pet's fur at all angles, that will effectively dispense until the bathing fluid in the reservoir is close to empty, that is compact and does not require the storage of multiple pieces of equipment and can perform the functions of a curry comb or deshedder, remove loose hair, house and apply fluid the pet's fur for bathing, and massage the coat during bathing to increase effective cleaning.

SUMMARY OF THE INVENTION

The present invention provides a device and method of using the device for pet care. One aspect of the invention is a device comprising a housing divided into a first and second halves that may be fastened together to form a single item or object. Each of the first and second halves having an interior side, an exterior side and a circumferential edge that contains the locking means to removably fasten the halves together. One half of the device is provided with a refillable liquid cavity with cap for holding liquid, a reusable sponge, massaging bristles extending through and beyond the reusable sponge on the interior side, and a liquid dispensing mechanism with one or more apertures for releasing the liquid into the reusable sponge. The other half may be hollow and has a grooming surface and vents to allow the reusable sponge to dry when the device is fastened together.

In one embodiment the locking means is threading, male/female joints, a peg and runner locking mechanism or a latch.

In other embodiment the liquid dispensing mechanism is a free-flowing liquid dispenser or a pump action mechanism dispenser; the grooming surface is a deshedding grooming surface or a serrated edge; at least one of said first and seconds halves further comprises a squeaker and/or a clicker; and when the first and second halves are fastened together they form a sphere or an oblong sphere.

Another aspect of the present invention is a method of cleaning a pet or a portion of a pet comprising the steps of opening the device into its separate halves; dispensing liquid from the liquid cavity onto the reusable sponge in the first half; applying the interior side of the first half to the coat of a pet to distribute the liquid and/or applying the grooming surface of the second half to the coat of the pet to remove loose hair; and allowing the liquid applied to the pet's coat to dry.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to the similar parts, and in which.

DETAILED DESCRIPTION OF THE INVENTION

Figure 1:
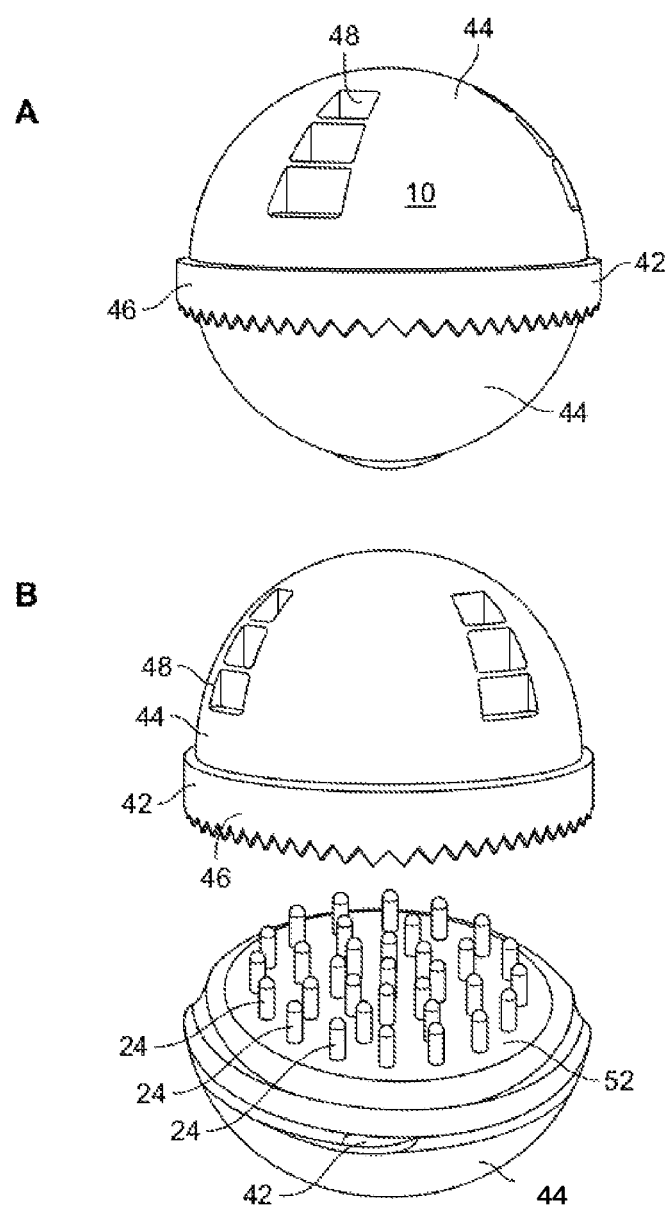
FIG. 1 (A) is a perspective side view of one embodiment of the present invention showing a ball-shaped device in the closed position and (B) the separated halves of the device in the open position.

The present invention provides a device and method of using the device for pet care. One aspect of the invention is a device comprising a housing divided into a first and second halves that may be fastened together to form a single item or object. Each of the first and second halves having an interior side, an exterior side and a circumferential edge that contains the locking means to removably fasten the halves together. One half of the device is provided with a refillable liquid cavity with cap for holding liquid, a reusable sponge, massaging bristles extending through and beyond the reusable sponge on the interior side, and a liquid dispensing mechanism with one or more apertures for releasing the liquid into the reusable sponge. The other half may be hollow and has a grooming surface and vents to allow the reusable sponge to dry when the device is fastened together.

Housing

The housing 12 of the device 10 is provided in two halves (14 and 44) and may be configured in a variety of shapes that allows for a reservoir for bathing fluid, a liquid dispensing mechanism 22, a grooming surface, massaging bristles 24 and a locking means 26 for fastening the two halves (14 and 44) together to form a single compact device 10. The shape may be dependent on the look and feel of the device 10 for the user. For example, the device 10 may be provided in a fanciful shape such as two halves (14 and 44) of a bone or a cartoon figurine, or may be provided in a shape that makes handling and manipulation easy such as a sphere or oblong sphere. In this regard, the exterior surface or exterior side of one or both of the halves may have a texturing (e.g., a graspable cover cap 54) to allow for more efficient gripping when bathing a pet. In one embodiment the device 10 is provided in a spherical shape.

The first half 14 of the housing may have a refillable reservoir with a cap 18, a liquid dispensing mechanism 22 within the reservoir, massaging bristles 24 extending from the interior side and a circumferential edge comprising a locking means 26. By way of example and not by way of limitation, the following elements are presented for a device whose configuration is spherical in shape. The first half 14 of the device 10 is generally hollow and concave providing an area in which a fluid chamber 28 may be created or inserted. If created the fluid chamber 28 may be prepared and adhered permanently or removably to the interior side of the first half 14. If permanently, the fluid chamber 28 may be adhered by adhesive, fused or otherwise connected using known methods in the art. If removable, the fluid chamber 28 may be secured in place by a threaded mounting on the interior side that interfaces with threads on the side of the fluid chamber 28. Correspondingly, a refillable liquid cavity 16 may be created by providing a removable or permanent wall 32 that abuts the interior side or sides of the first half 14. If permanent the wall 32 can be adhered to the interior side or sides of the first half 14 with adhesive, fusing or other known method in the art. If removable, the wall 32 may be secured in place by a threaded mounting provided on the interior side that interfaces with threads on the side of the wall 32 thereby creating a refillable liquid cavity 16. This cavity 16 may also be used to house a flexible refillable chamber that may be permanent or removable. If removable the refillable liquid cavity wall 32 created above may be provided with threads that interface with mounting threads provided in the interior wall or walls of the first half 14 so that it may be easily removed to replace the flexible refillable chamber.

The refillable liquid cavity 16, fluid chamber 28 or flexible refillable liquid chamber is in fluid connectivity with the liquid dispensing mechanism 22. A variety of liquid dispensing mechanisms 22 known in the art may be utilized with the present invention that permit effective dispensing of bathing fluid from the chamber or cavity (16 or 28) that is relatively independent of the orientation of the device 10 during use and the amount of fluid remaining in the chamber or cavity (16 or 28). In one embodiment, the spray mechanism is a spring activated button sprayer in which downward force is applied to the spray button and the fluid present in the housing is pressurized to rise along the vertical duct to then disperse through the spray nozzle 38. Correspondingly, when the downward force, having been applied to the spray button is released, the vertical duct is closed by the rod of the poppet valve and the inner pressure of housing drops while the piston moves upward, whereby the fluid present in the container enters the housing to compensate for the reduced pressure. In another embodiment the dispensing mechanism provides a push button 34 on the exterior side of the first half 14 that may be depressed when additional bathing liquid is desired but cannot be easily depressed inadvertently or accidentally for example the activation of the dispensing function requires depressing of the button 34 by a certain distance, (e.g., ¼ to 1 inch) that would make incidental pressing difficult. In addition, the location of the button 34 is positioned at or about the center of the exterior side which during use would be positioned at or about the palm of the hand making depression of the button accidentally more difficult.

The dispensing mechanism 22 may also comprise one or more apertures 36 for releasing the liquid from the chamber and/or cavity (28 or 16). These may be strategically positioned along the interior side of the first half 14 (e.g., positioned in the refillable liquid cavity wall 32 or the base of the refillable fluid chamber 28 parallel to the circumferential edge of the first half 14) to assure that liquid is dispensed relatively uniformly over the interior side. Alternatively, there may be a single liquid dispensing aperture 36 located about the middle of the interior side. The apertures 36 may also comprise nozzles 38 that assist in distributing the liquid in a more desired dispersal pattern. A variety of nozzles 38 known in the art may be used. The nozzles 38 may have a narrow or wide spraying aspect depending on their location and number to assure relatively even distribution of the liquid.

The refillable liquid cavity wall 32 and/or the base of the refillable fluid chamber may further comprise massaging bristles 24 that extend from the surface of the cavity wall and/or base of the chamber about perpendicular from the cavity wall or chamber base into the interior side of the first half 14. The length, width and number of bristles 24 will depend on a number of conditions including the surface area provided by the cavity wall 32 or chamber base, the thickness of the pet's coat and the length of the pet's fur. For example, if the surface of the cavity wall 32 or chamber base is small there will likely be less bristles 24 than the same device that is larger having a larger cavity wall 32 or chamber base surface area. Correspondingly, if the pet's fur is thick it may be desirable to have longer bristles 24 to reach more deeply into the pet's fur and if the fur is long and prone to tangling it may be desirable to have fewer bristles 24 to catch in the pet's fur. The bristles 24 may range in number from 3 to 50. There width may range from 2 to 7 millimeters and may be the same width over the length of the bristle 24 or they may be tapered having a thicker base where they attached to the cavity wall or chamber base narrowing as they extend outward or vice versa or have one or more retaining rings along their length that may be utilized to assist in retaining a sponge 52 fitted about and around the bristles 24. They may also have a length from about 1 centimeter to about 4 centimeters. In one embodiment, the bristles 24 are perpendicular to the cavity wall 32 and/or chamber base. In another embodiment, the bristles 24 may extend from the cavity wall 32 or chamber base at an angle wherein the angle may range from 91° to about 120°. The angled bristles may form a pattern such the bent bristles from a circular pattern or there may be alternating rows with one line of bristle bent in one direction and the next row bent in the opposite direction or not bent at all. A variety of these patterns are within the knowledge of those skilled in the art based on the desired effect to be achieved.

The circumferential edge of the first half 14 will have a locking means 42 that allows both halves (14 and 44) to be removably fastened together when the device 10 is not in use. A variety of locking means 42 may be used to achieve this objective. For example, the circumferential edge may have threads that interface with corresponding threads on the circumferential edge of the second half 44. Another method could be the use of a press and twist connector wherein each half (14 and 44) has a clip ridge, a slide groove and clip ridge opening along the slide groove that accepts the clip ridge of the other half. In use the clip ridges of both halves (14 and 44) are aligned with the clip ridge opening of the other half and then the halves a twisted guiding the clip ridges into and along the slide groove locking the two halves together. Other methods and mechanisms known in the art may be used to secure the two halves (14 and 44) together when the device 10 is not in use.

The second half 44 of the housing 12 may be hollow and provides a grooming surface, vents 48 and a circumferential edge having a locking means 26 for removably fastening the two halves (14 and 44) together. In one embodiment, the second half 44 of the housing 12 is hollow and provided with a grooming edge 46 along its perimeter. This grooming edge 46 may be form molded with the second half 44, it may be a separate piece made of flexibly polymer and affixed to the circumferential edge of the second half 44 or it may be affixed to the second half 44 by some other means known to those skilled in the art. The grooming edge 46 may be serrated or may be provided with comb like teeth that may be used to brush the pet's coat to remove loose hair. In another embodiment, the second half 44 is provided with both a serrated perimeter edge and a circular comb wherein the circular comb is removably affixed within the perimeter edge of the second half 44. For example, the interior side of the second half 44 may have a threaded mounting that can accept a circular comb having a corresponding threaded base. When a comb is desired the second half 44 can be used as is. When the serrated edge is desired the circular comb can be removed and later replaced as needed. The threaded mounting for the comb may be used for a variety of other accessories if desired. For example, a flexible nippled polymer sheet having a threaded base could be affixed into the second half 44 to be used for removing loose hair.

The second half 44 may also be provided with vents 48 arranged along its surface that extend through the housing 12 to provide circulation in the interior side of the housing 12 when both halves (14 and 44) are fastened together. These vents 48 may be provided in a variety of shapes, sizes and number. For example, in one embodiment, the vents 48 are arched elongated slats or they could be round apertures. The size of these vents 48 may be from 1 to 3 centimeters in length and 2 to 10 millimeters in width or they could be from 2 millimeters to 20 millimeters in diameter. There could be as few as 2 to 30 vents 48 on the second half 44.

A variety of materials may be used to prepare each half of the housing that are light weight, resilient to impact, damage resistant and water resistant. A preferred material is plastic, carbon fiber or other polymer known in the art to have these preferred characteristics. Each element may be prepared independently of the other elements or where possible formed together as a single unit. If formed separately they may be assembled from elements of the same composition or different compositions depending on their desired or intended use. Elements may be form molded, injection molded or prepared using any known method in the art for providing elements of a device for assembly. In one embodiment, the first and second halves (14 and 44) are prepared from the same materials.

Reusable Sponge

A reusable sponge 52 may be utilized in the present invention and fitted within the first half 14 of the housing 12 flush against the cavity wall 32 or chamber base with the bristles 24 extending thorough the sponge 52 assisting in holding the sponge 52 in place. The sponge 52 may be made of a variety of materials that have an open matrix, absorb liquid and when compressed expel the adsorbed liquid. The material should be resilient and able to withstand the continued scrubbing that the material may endure during use, able to be sterilized or easily cleaned and able to transfer fluid deposited from the refillable liquid cavity 16, fluid chamber 28 or flexible refillable liquid chamber from one side to the other side of the sponge 52.

A variety of methods known to those in the art may be used to assist in securing the sponge 52 within the interior side of the first half 14. For example, a ridge may extend perpendicular and along the inside perimeter edge of the first half 14. Correspondingly, the sponge 52 may have a lip along the perimeter edge of its base that contacts this ridge and holds the sponge 52 in place. This lip may be created from the same sponge material or it may be made of another material such as a flexible polymer and adhered to the perimeter edge of the sponge 52 such as by adhesive or heat fusion. This edge may also comprise a tab that allows the user to easily remove the sponge 52 for cleaning and/or replacement. This tab may be made of the same sponge material or may be made of a flexible polymer material adhered to the sponge 52. The sponge size and shape is such that the sponge 52 fits snugly into the interior side of the first half 14. Its thickness will depend on the type of sponge used and the space allocated between the cavity wall 32 and/or chamber base and the circumferential edge. This may range from 1 centimeter to 4 centimeters.

Other

The device 10 may further include a variety of other elements such as a squeeker or clicker. A variety of these types of mechanisms are known and one skilled in the art could incorporate such elements into the device 10 of the present invention. For example, these elements may be provided on the first and/or second half (14 and/or 44) of the housing 12 to better control the pet during bathing.

With the above in mind, attention is now directed to FIG. 1, perspective views of a spherically configured device in the closed position and the two halves (14 and 44) of the device 10 in the open position. The second half 44 of the device 10 is hollow to help collect the pet's loose hair and along the circumference is a rubber/plastic/metal band with serrated edges for deshedding. Along the dome of this half 44 of the device 10 are air vents 48 that will allow the sponge 52 in the opposing half to dry when not in use. The first half 14 of the device 10 contains massaging bristles 24; a liquid cavity 16 for holding a liquid grooming product, such as a leave-in shampoo (below the sponge 52 and bristles 24); and a liquid dispensing mechanism 22 that, when activated, dispenses liquid to a reusable sponge 52 at the base of the massaging bristles 24 (not shown). The sponge 52 is held in place at the base of the massaging bristles 24 by an overhanging lip along the circumference of the interior half of the device 10 (not shown). The rubber/plastic/metal bristles 24 for massaging are provided along the interior side of the first half 14 of the device (14 and 44) 10 on the cavity wall 32 or chamber base. In addition, one or more liquid dispensing apertures 36 that allow liquid within the cavity to be dispensed are provided in the cavity wall 32 or chamber base (not shown). On the exterior half of the device 10 is a button 34 that, when pressed, will cause liquid to be dispensed from the liquid dispensing apertures 36 (not shown).

Figure 2:
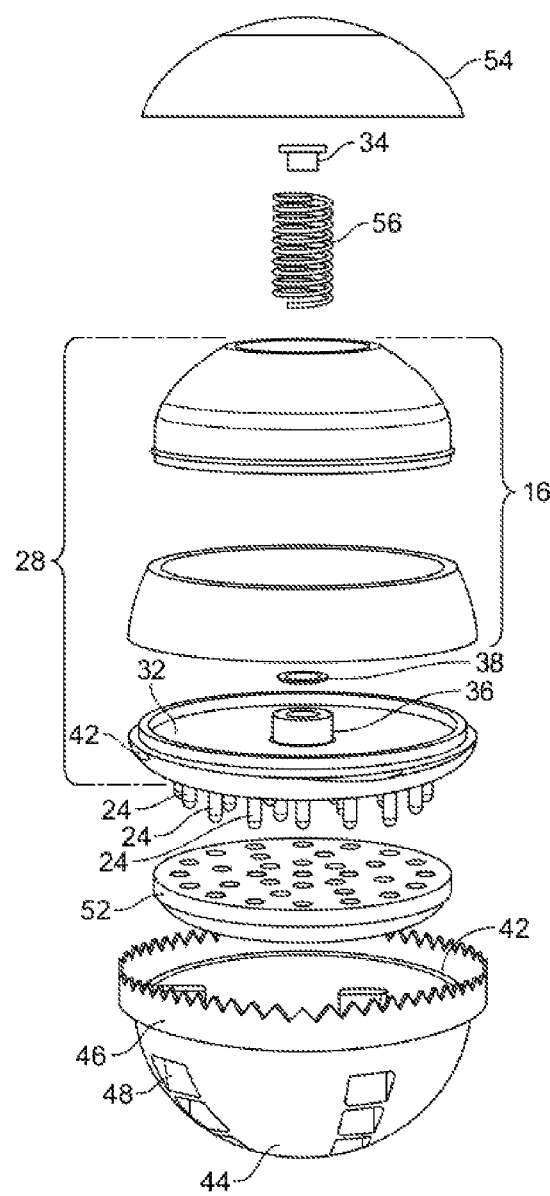
FIG. 2 is an exploded side view of the device shown in FIG. 1.

FIG. 2 shows an exploded view of the device. From top to bottom the figure shows a graspable cover cap 54 for the second half 44 of the housing 12 a depressible button 34 for dispensing liquid from the refillable liquid cavity 16 and/or fluid chamber 28, a spring 56 that returns the depressible button 34 to its ready position, the next two pieces from the upper portion of the refillable liquid cavity 16 or chamber 28 that are combined with the next piece to complete the chamber 28 or cavity 16 also referred to as the chamber base in this configuration. In the center of the chamber base is an aperture 36 fitted with a nozzle 38 to dispense fluid from the fluid chamber 28 to the sponge 52. Also, extending from the surface of the chamber base are a number of bristles 24 for massaging the fluid into the pet's fur. The next element shown is the reusable sponge 52 with apertures 36 to allow the bristle 24 to extend there through. The second half 44 of the device 10 is shown as the final element having a serrated grooming edge and vents 48 for allowing circulation of air to the sponge 52 when the device 10 is not in use.

Figure 3:
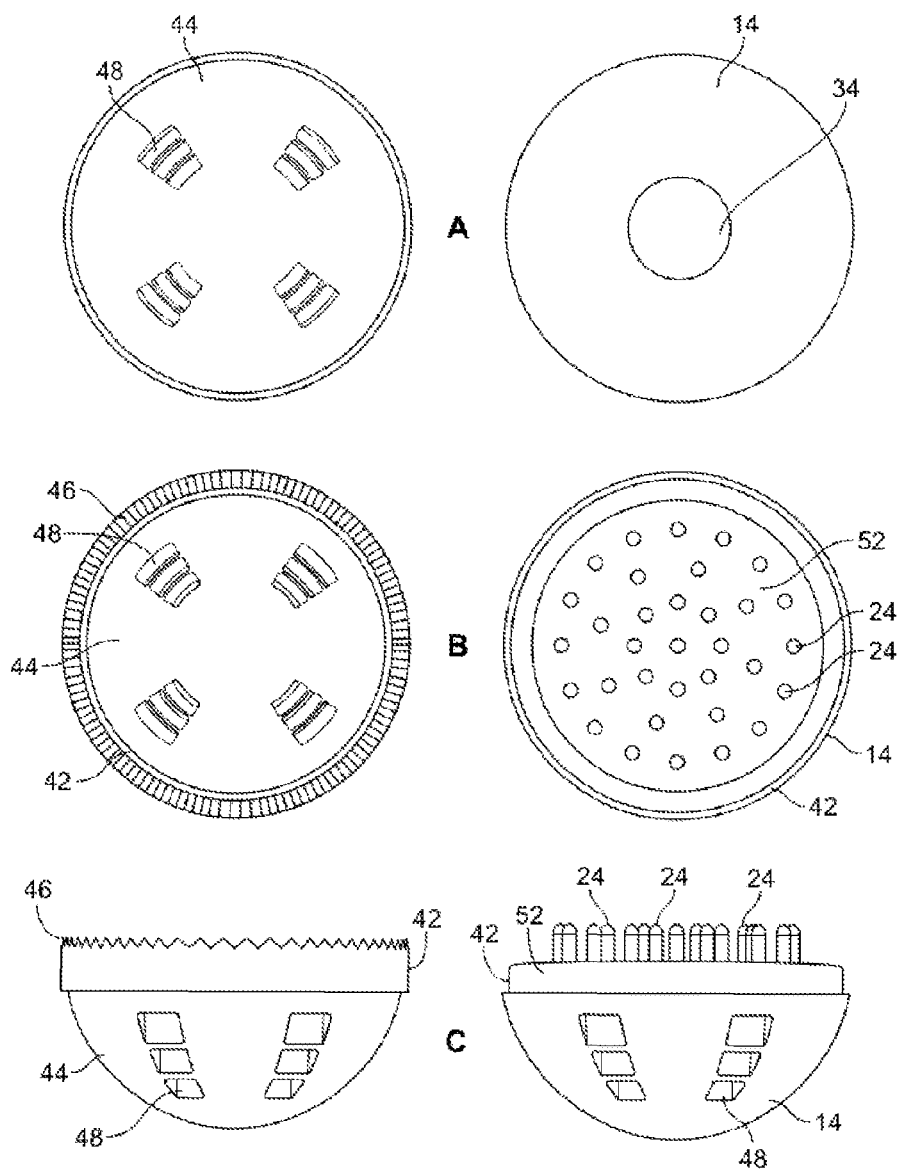
FIG. 3 shows the (A) top view, (B) bottom view and (C) side view of each of the halves of the device in FIG. 1.

FIG. 3 provides images for the top, interior side and side profiles of both the first and second halves (14 and 44).

Use

Prior to use the cap to the liquid cavity is removed and the fluid level is checked. If there is insufficient fluid additional desired fluid is dispensed into the liquid cavity and the cap securely replaced. The first half is then separated from the second half and the liquid dispensing mechanism is activated by depressing the push button thereby releasing fluid through the aperture and nozzle and into the reusable sponge. The bristles and sponge of the second half is then applied to the pet's coat.

It will be appreciated that details of the foregoing embodiments, given for purposes of illustration, are not to be construed as limiting the scope of this invention. Although several embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

The invention claimed is:

1. A device for grooming a pet comprising;
a housing having a first half and a second half,
wherein each of said halves having an interior side, an exterior side and a circumferential edge,
wherein said circumferential edge having a locking means so that said first and said second halves may be removably fastened together,
wherein said first half having a refillable liquid cavity for holding liquid, said liquid cavity having a removable cap for filling said cavity, a reusable sponge, massaging bristles extending through and beyond said reusable sponge on said interior side, and a liquid dispensing mechanism having one or more apertures for releasing said liquid into said reusable sponge, and
wherein said second half is hollow having a grooming surface and vents to allow said reusable sponge to dry when fastened together.

2. The device according to claim 1, wherein said locking means is threading, male/female joints, a peg and runner locking mechanism or a latch.

3. The device according to claim 1, wherein said liquid dispensing mechanism is a free-flowing liquid dispenser or a pump action mechanism dispenser.

4. The device according to claim 1, wherein said grooming surface is a deshedding grooming surface or a serrated edge.

5. The device according to claim 1, wherein at least one of said first and seconds halves further comprises a squeaker and/or a clicker.

6. The device according to claim 1, wherein said housing when said first and second halves are fastened together forms a sphere or an oblong sphere.

7. A method of cleaning a pet or a portion of said pet comprising the steps of:
opening a pet grooming device having a housing with a first half and a second half,
wherein each of said halves having an interior side, an exterior side and a circumferential edge,
wherein said circumferential edge having a locking means so that said first and said second halves may be removably fastened together when not in use,
wherein said first half having a refillable liquid cavity for holding liquid, said liquid cavity having a removable cap for filling said cavity, a reusable sponge, messaging bristles extending through and beyond said reusable sponge on said interior side, and a liquid dispensing mechanism having one or more apertures for releasing said liquid into said reusable sponge, and
wherein said second half is hollow having a grooming surface and vents to allow said reusable sponge to dry when not in use;

dispensing said liquid from said liquid cavity onto said reusable sponge in said first half;

applying said interior side of said first half to the coat of said pet to distribute said liquid and/or applying said grooming surface of said second half to said coat of said pet to remove loose hair; and allowing said liquid applied to said coat of said pet to dry.

8. The method according to claim 7, wherein said locking means is threading, male/female joints, a peg and runner locking mechanism or a latch.

9. The method according to claim 7, wherein said liquid dispensing mechanism is a free-flowing liquid dispenser or a pump action mechanism dispenser.

10. The method according to claim 7, wherein said grooming surface is a deshedding grooming surface or a serrated edge.

11. The method according to claim 7, wherein at least one of said first and seconds halves further comprises a squeaker and/or a clicker.

12. The method according to claim 7, wherein said housing when said first and second halves are fastened together forms a sphere or an oblong sphere.

\* \* \* \* \*